(12) United States Patent
Nobe et al.

(10) Patent No.: US 7,599,104 B2
(45) Date of Patent: Oct. 6, 2009

(54) IMAGE READING APPARATUS AND MULTI-FUNCTIONAL APPARATUS HAVING A PLATE-LIKE PRESSING MEMBER

(75) Inventors: Hiroshi Nobe, Nagoya (JP); Atsushi Hayakawa, Okazaki (JP); Hideaki Nagasaka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 799 days.

(21) Appl. No.: 10/930,921

(22) Filed: Sep. 1, 2004

(65) Prior Publication Data
US 2005/0141056 A1 Jun. 30, 2005

(30) Foreign Application Priority Data
Sep. 2, 2003 (JP) ............................. 2003-310692

(51) Int. Cl.
H04N 1/04 (2006.01)
(52) U.S. Cl. .................... 358/498; 358/496; 358/474
(58) Field of Classification Search ................ 358/498, 358/474, 471, 400, 1.1, 496; 361/809, 807, 361/679, 600; 271/10.11, 10.09, 10.01, 8.1, 271/121, 109, 18; 439/497
See application file for complete search history.

(56) References Cited

U.S. PATENT DOCUMENTS

| 4,625,097 | A | * | 11/1986 | Miwa | 219/441 |
| 5,739,925 | A | | 4/1998 | Kameyama et al. | |
| 5,802,171 | A | * | 9/1998 | Deutsch | 379/419 |
| 6,043,908 | A | * | 3/2000 | Takeuchi | 358/496 |
| 6,661,543 | B1 | * | 12/2003 | Morita | 358/498 |
| 7,023,588 | B2 | * | 4/2006 | Satou | 358/474 |
| 7,027,194 | B2 | * | 4/2006 | Kanda | 358/496 |
| 2002/0192000 | A1 | * | 12/2002 | Yasui et al. | 400/582 |

FOREIGN PATENT DOCUMENTS

| JP | A-10-177224 | 6/1998 |
| JP | A 10-190939 | 7/1998 |
| JP | A 10-228840 | 8/1998 |
| JP | A 11-343055 | 12/1999 |
| JP | A 2000-49989 | 2/2000 |
| JP | B2 3111440 | 9/2000 |
| JP | A 2000-305418 | 11/2000 |
| JP | A-2002-125091 | 4/2002 |
| JP | A 2002-247260 | 8/2002 |
| JP | A 2003-140805 | 5/2003 |

* cited by examiner

*Primary Examiner*—Cheukfan Lee
(74) *Attorney, Agent, or Firm*—Oliff & Berridge, PLC

(57) ABSTRACT

An image reading apparatus includes a transport path that is inclined downwardly as advancing from an upstream side to a downstream side, an image reading section disposed in a middle of the transport path, a cover member that is bent to cause downward inclination of a face on the downstream side of the transport path to be larger than an inclination of a face on the upstream side, a support member having a plate form, the support member disposed on a rear face of the cover member and protruding toward the upstream side from a proximity of a position where the cover member is bent in the face on the downstream side, and a pressing member in which another end is supported by the support member to cause one end to be contactable with the image reading section, thereby pressing the transported medium against the image reading section.

12 Claims, 7 Drawing Sheets

IMAGE READING APPARATUS AND MULTI-FUNCTIONAL APPARATUS HAVING A PLATE-LIKE PRESSING MEMBER

BACKGROUND OF THE INVENTION

1. Field of the Invention

The present invention relates to an image reading apparatus in which the size can be reduced, and also to a multi-functional apparatus having such an image reading apparatus.

2. Description of the Related Art

Recently, a multi-functional apparatus which has an image reading apparatus, an image forming apparatus, a facsimile apparatus, and the like, and which can be used in various applications such as a scanner, a fax, a printer, and a copier is in widespread use. In an image reading apparatus mounted in such a multi-functional apparatus, in order to reduce the cost of the multi-functional apparatus, an expensive CCD image sensor is not used in an operation of reading an original serving as a medium to be read, and the reading operation is conducted with using a contact image sensor (hereinafter, abbreviated as "CIS").

A CIS has a shallower depth of field than a CCD image sensor. In order to read an image without blurring, therefore, an original must be in close contact with a CIS during a reading operation. In an image reading apparatus, consequently, a member for pressing an original against a CIS placed in a transport path through which the original is transported is disposed. In JP-A-10-190939, for example, a white back roller is made press contact with a CIS to press an original that passes the press contact portion, thereby preventing the original from raising from the CIS.

In order to enable the white back roller to be in press contact with the CIS, a pressing force must be applied to a shaft of the roller. In order to prevent a failure from occurring in transportation of an original, moreover, the right and left sides of the shaft must be pressed in a balanced manner. Therefore, parts for respectively pressing the right and left sides of the shaft must be disposed, and the parts must be accurately attached. As a result, the number of used parts is increased, and the production process becomes complicated.

Inventors of the present invention have developed a configuration in which, in place of a roller, a swingable plate-like member is disposed and a pressing member such as a spring is disposed on the back face of the member, whereby operations of pressing the pressing member against the CIS can be simplified and the number of parts can be reduced. For example, a transport path for an original is disposed so that the original passes over the CIS. The CIS is disposed in the bottom face of the transport path, and the pressing member is swingably supported on the upper face of the transport path, so that the swinging end of the pressing member is contacted with and separated from the CIS. A spring is attached between the pressing member and the upper face of the transport path to give an urging force to the pressing member. At this time, a spring is disposed in the middle of the pressing member in a direction perpendicular to the swinging direction of the pressing member, so that the urging force exerted on the pressing member is uniform in the direction.

The supported end of the pressing member is disposed upstream in the original transportation direction from the swinging end, to reduce a load that is imposed when the tip end of the original butts against the pressing member. A support member for supporting the pressing member is formed as a pair of plate-like members in which the longitudinal direction coincides with the original transportation direction to maintain the strength, the plate-like members protrude from the upper face of the transport path toward the bottom face, and the end portions of the downstream side in the original transportation direction support the both supported ends of the pressing member, respectively.

Because of the recent tendency that the size of a multi-functional apparatus is reduced, in a configuration where an image forming apparatus is disposed in a lower stage and an image reading apparatus is disposed in an upper stage, it is preferable to cover the transport path with a cover on the upper face of the image reading apparatus, thereby reducing the thickness. In a configuration where an original is transported from the back face of a multi-functional apparatus to the front face, the transport path is preferably configured so as to be downward inclined in order to allow the user to easily set originals.

SUMMARY OF THE INVENTION

When the transport path is inclinedly disposed in consideration of convenience of the user, however, the level difference is formed also in the cover that is substantially parallel to the transport path, and hence the total height of the multi-functional apparatus is increased because the image reading apparatus is positioned in the upper stage of the multi-functional apparatus. In order to further reduce the size of such a multi-functional apparatus (reduce the total height of the multi-functional apparatus), therefore, the inventors has bent the cover so that the downward inclination of the cover portion which is opposed to the upstream side of the transport path is smaller than that of the cover portion which is opposed to the downstream side. However, a problem has been arisen in that the upper face of the upstream side of the transport path is squeezed, and the support member of the pressing member disposed in the upper face is made close to the bottom face of the transport path, thereby causing a failure in transportation of an original.

In order to reduce the size of a multi-functional apparatus, the inventors have developed a configuration in which keys for operating the apparatus are disposed on the surface of the cover, and the cover is formed as one piece by injection molding so as to reduce the production cost. In this configuration, when the depressing direction of keys disposed on one of faces of the upstream and downstream sides of the bent cover coincides with the drawing direction of molds, the depressing direction of keys disposed on the other face does not coincide with the drawing direction of molds, and hence ribs for guiding the keys in the key depressing direction cannot be formed, thereby producing a problem in that a trouble is caused in operation of the keys on the face in which the depressing direction does not coincide with the drawing direction.

A wiring circuit board which conducts, for example, detection of depression of a key must be disposed on the rear face of the cover. Since the cover is bent, the size and position of the wiring circuit board are restricted, and electrical connections between a control circuit board of the main unit of the apparatus and the wiring circuit board, such as signal lines interfere with the original transport path. Consequently, there are problems such as that, in order to prevent a failure in transportation of an original from occurring, the signal lines must be fixed at intervals.

The invention has been conducted in order to solve the problems. An image reading apparatus and a multi-functional apparatus having such an image reading apparatus are disclosed herein, in which the total size of the apparatus can be reduced while preventing a failure due to a reduced height of the apparatus from occurring.

According to an aspect of the invention, there is provided an image reading apparatus including: a transport path through which a medium to be read is transported, and which is inclined downwardly as advancing from an upstream side in a transportation direction to a downstream side; an image reading section disposed in a middle of the transport path and reading an image formed on the medium to be read that is transported along the transport path; a cover member which is disposed to cover the image reading section and the transport path, and which is bent to cause downward inclination of a face on the downstream side of the transport path to be larger than an inclination of a face on the upstream side; a support member having a plate form, the support member disposed on a rear face of the cover member and protruding toward the upstream side from a proximity of a position where the cover member is bent in the face on the downstream side; and a pressing member in which another end is supported by the support member to cause one end to be contactable with and separable from the image reading section, thereby pressing the transported medium to be read against the image reading section.

In this configuration, the protrusion position of the support member for the pressing member disposed in the transport path which is inclined downwardly is improved, so that the inclination of the portion of the upstream side in the cover member covering the transport path is made smaller than that of the portion of the downstream side without causing the support member to squeeze the transport path. Therefore, the total height of the apparatus can be shortened, and the size of the apparatus can be reduced.

According to another aspect of the invention, there is provided an image reading apparatus including: a transport path through which a medium to be read is transported, and which is inclined downwardly as advancing from an upstream side in a transportation direction to a downstream side; an image reading section disposed in a middle of the transport path and reading an image formed on the medium to be read that is transported along the transport path; a cover member which is disposed to cover the image reading section and the transport path, and which is bent to cause downward inclination of a face on the downstream side of the transport path to be larger than an inclination of a face on the upstream side; a key that is depressably disposed on a surface of the cover member; and a guide member that is placed on a rear face of the cover member to guide a depressing direction of the key disposed on one of faces of the surface of the cover member, the faces being respectively upstream and downstream in the transport path with respect to the position where the cover member is bent.

In this configuration, when the cover member is formed by injection molding, the depressing direction of the key in a portion different from the drawing direction of molds can be guided by the guide member. Therefore, the cover member can be formed as one piece. As a result, the production cost can be lowered, the operability of the apparatus is not impaired, and the miniaturization of the apparatus is not impeded.

According to still another aspect of the invention, there is provided an image reading apparatus including: a transport path through which a medium to be read is transported, and which is inclined downwardly as advancing from an upstream side in a transportation direction to a downstream side; an image reading section disposed in a middle of the transport path and reading an image formed on the medium to be read that is transported along the transport path; a cover member which is disposed to cover the image reading section and the transport path, and which is bent to cause downward inclination of a face on the downstream side of the transport path to be larger than an inclination of a face on the upstream side; a wiring circuit board which is disposed on a rear face of the cover member, and which has a circuit for detecting depression of a key or conducting a display on a displaying section; and an intermediate circuit board which is disposed in an end portion of the rear face of the cover member, and which relays electrical connection between the apparatus and the wiring circuit board.

In this configuration, electrical connections between the wiring circuit board disposed on the rear face of the cover member and the apparatus can be conducted through the intermediate circuit board, and the intermediate circuit board can be placed in an end portion of the cover member. Therefore, it is possible to easily eliminate a failure which may occur in the electrical connection between the wiring circuit board and the apparatus when the size of the apparatus is reduced.

BRIEF DESCRIPTION OF THE DRAWINGS

The present invention may be more readily described with reference to the accompanying drawings.

DETAILED DESCRIPTION OF THE PREFERRED EMBODIMENTS

Figure 1:
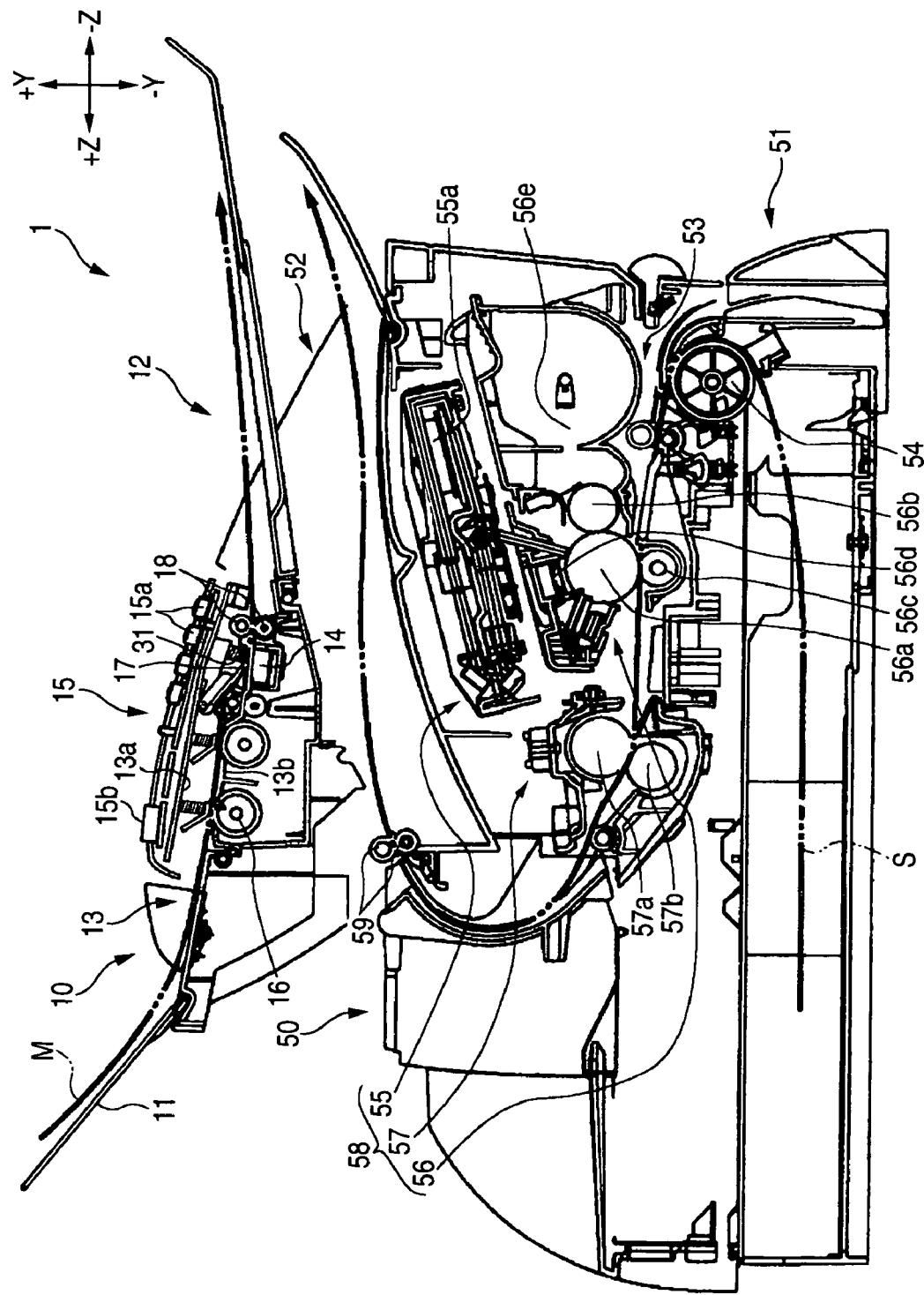
FIG. 1 is a central sectional view of a multi-functional apparatus.

Hereinafter, an embodiment of an image reading apparatus and a multi-functional apparatus having such an image reading apparatus in which the invention is embodied will be described with reference to the accompanying drawings. Referring to FIG. 1, first, the whole configuration of a multi-functional apparatus 1 will be described. FIG. 1 is a central sectional view of the apparatus 1. Hereinafter, the directions of −Z, +Z, +Y, −Y, +X, and −X are referred to as the front direction, the back direction, the upper direction, the bottom direction, the right side direction, and the left side direction, respectively.

As shown in FIG. 1, the apparatus 1 has a configuration in which an image reading apparatus 10 for reading an image formed on a medium to be read is placed in an upper portion in the sectional view, and an image forming apparatus 50 for forming an image on a medium to be recorded is placed in a lower portion. The apparatus 1 has: a scanner function due to the image reading apparatus 10; a printer function due to the image forming apparatus 50; and a copying function which is conducted by printing an image of an original read by the image reading apparatus 10 on a sheet by the image forming apparatus 50. The apparatus 1 further has a facsimile function which is not shown, and a modem, an NCU, and the like which are known and not shown, and which are used for transmitting an image read by the image reading apparatus 10 as FAX data to a terminal apparatus in a communication destination via a public communication network. The image forming apparatus 50 can print an image based on FAX data received from a terminal apparatus in a communication destination.

The image forming apparatus 50 is configured as a so-called laser printer, which is known. In a substantially middle portion of the image forming apparatus 50, an image forming unit 58 which forms an image on a sheet serving as a medium to be recorded is disposed. A sheet supply cassette 51 which stackingly stores sheets is placed below the image forming unit 58, and a sheet discharge tray 52 onto which sheets bearing an image are discharged to be stackingly held. An S-like sheet transport path 53 is disposed in the image forming apparatus 50 so that a sheet picked up from the sheet supply cassette 51 is passed through the image forming unit 58, an image is formed on the sheet, and the sheet is then discharged onto the sheet discharge tray 52 (in the figure, the sheet transport path is indicated by the two-dot chain line S).

The sheet supply cassette 51 is attached to a bottom portion of the apparatus 1 so as to be attachable and detachable from the side of the front direction of the apparatus 1. A sheet supply roller 54 which feeds a sheet held in the sheet supply cassette 51 to the transport path 53 is disposed in the front face side of the apparatus 1 and above the sheet supply cassette 51. When a printing process is to be conducted, the sheet supply roller 54 picks up a sheet and then feeds the sheet in the front direction of the apparatus 1. In the vicinity of the sheet supply roller 54, the transport path 53 is formed into a U-like shape so that the sheet guided by the transport path 53 is directed toward the back face of the apparatus 1.

The image forming apparatus 50 is configured by: a laser unit 55 which emits a laser beam; a process unit 56 which forms a developer image by a developer such as a toner on the basis of the laser beam emitted from the laser unit 55 and which transfers the image onto the sheet; and a fixing unit 57 which fixes the image formed on the sheet by the process unit 56, onto the sheet.

In the laser unit 55, the laser beam emitted from a laser beam generating section which is not shown is scanned on the basis of print data in the main scanning direction (the direction perpendicular to the sheet transportation direction) by a rotated polygon mirror 55a, and the laser beam is transmitted or reflected by plural lenses and mirrors to exposure scan the surface of a photosensitive drum 56a of the process unit 56.

In the process unit 56, the photosensitive drum 56a, a developing roller 56b, a transfer roller 56c, a charging device 56d, and the like are disposed. The photosensitive drum 56a is a drum on the surface of which an invisible electrostatic latent image is formed by a potential difference. The surface of the photosensitive drum 56a is positively charged to a high potential (for example, +1,000V) by the charging device 56d which is disposed upstream in the rotational direction. The laser beam from the laser unit 55 illuminates the surface. In only the portion illuminated with the laser beam, the surface potential is lowered (for example, +100V). As a result, an electrostatic latent image is formed by high-potential and low-potential portions.

The developing roller 56b is disposed downstream in the rotational direction from the position of the photosensitive drum 56a which is exposed to the laser beam, charges a positively chargeable toner housed in a toner box 56e, and then supplies the charged toner to the photosensitive drum 56a on which the electrostatic latent image is formed. The developing roller 56b charges the toner to a potential (for example, +400 V) which is between the high and low potentials on the surface of the photosensitive drum 56a. At the position where the developing roller 56b is close to the photosensitive drum 56a, the toner carried by the developing roller 56b is selectively transferred to the low-potential portion of the photosensitive drum 56a.

The transfer roller 56c is placed downstream in the rotational direction of the photosensitive drum 56a from the developing roller 56b. A nip portion between the transfer roller and the photosensitive drum 56a is placed on the transport path 53 so that the sheet passes the portion. A bias is applied to the transfer roller 56c so that the potential of the roller is lower than that of the low-potential portion of the photosensitive drum 56a. Therefore, the developer image formed on the surface of the photosensitive drum 56a is electrostatically attracted by the transfer roller 56c from the rear side of the sheet passing the nip portion between the transfer roller and the photosensitive drum 56a, to be transferred onto the surface of the sheet.

The fixing unit 57 is configured by a heating roller 57a which gives heat of about 200 deg. to the sheet bearing a toner, thereby melting or softening the toner; and a pressure roller 57b which is urged so as to be pressed against the heating roller 57a. A nip portion between the heating roller 57a and the pressure roller 57b is placed on the transport path 53. When the sheet is passed through the nip portion, the toner on the sheet is heated and pressurized to be fixed to the sheet.

The transport path 53 is formed into a U-like shape in a position where the path has passed through the image forming unit 58, and guides the sheet to the sheet discharge tray 52 which is placed above the image forming unit 58. The sheet that is transported in the image forming unit 58 in the direction from the front face of the apparatus 1 to the back face is guided by the transport path 53 so that the transportation direction is directed to the front face of the apparatus 1, and then discharged onto the sheet discharge tray 52. A pair of sheet discharge rollers 59 are disposed in the tail end of the transport path 53, and the sheet is sent onto the sheet discharge tray 52 by the sheet discharge rollers 59.

A transport path 13 which transports an original serving as a medium to be read in a direction from the back face of the apparatus 1 to the front face is disposed inside the image reading apparatus 10 (in the figure, the original transport path is indicated by the two-dot chain line M). A CIS 14 which reads the intensity of reflected light of light emitted from a light source (not shown) toward the original, and which digitizes the read intensity is disposed in a bottom face 13b of the transport path 13. An original tray 11 which stackingly holds originals and supplies the originals to the transport path 13 is disposed at a start end in the transportation direction of the transport path 13. A discharge tray 12 which stackingly holds originals that have been subjected to the image reading process and discharged from the transport path 13 is disposed in the tail end of the transport path. The CIS 14 functions as an image reading section.

A supply roller 16 is disposed in the start end of the transport path 13. An original held on the original tray 11 is picked up by the supply roller 16 to be fed into the transport path 13. A pressing plate 17 is disposed above the CIS 14, and urged toward the CIS 14. When an original is passed above the CIS 14, the original is caused to be in close contact with the CIS 14 by the pressing plate 17, so that the CIS 14 having a shallow depth of field can stably read an image without blurring. The pressing plate 17 will be described later in detail. A pair of sheet discharge rollers 18 are disposed in the tail end of the transport path 13, and the original is sent onto the discharge tray 12.

An operation panel 15 through which the apparatus 1 is operated is disposed in an upper portion of the image reading apparatus 10. The operation panel 15 functions as a cover of the upper face of the transport path 13 to cover the transport path 13. When a failure occurs in transportation of an original, for example, the panel is swung about the rear end to open the front side, thereby enabling the transport path 13 to be exposed. In the operation panel 15, plural keys 15a, 15c (see FIG. 4) through which the user instructs the operation of the apparatus 1, and an LCD 15b on which a menu, messages, and the like are displayed to the user are disposed. The operation panel 15 and an intermediate plate described later function as a cover member.

Figure 2:
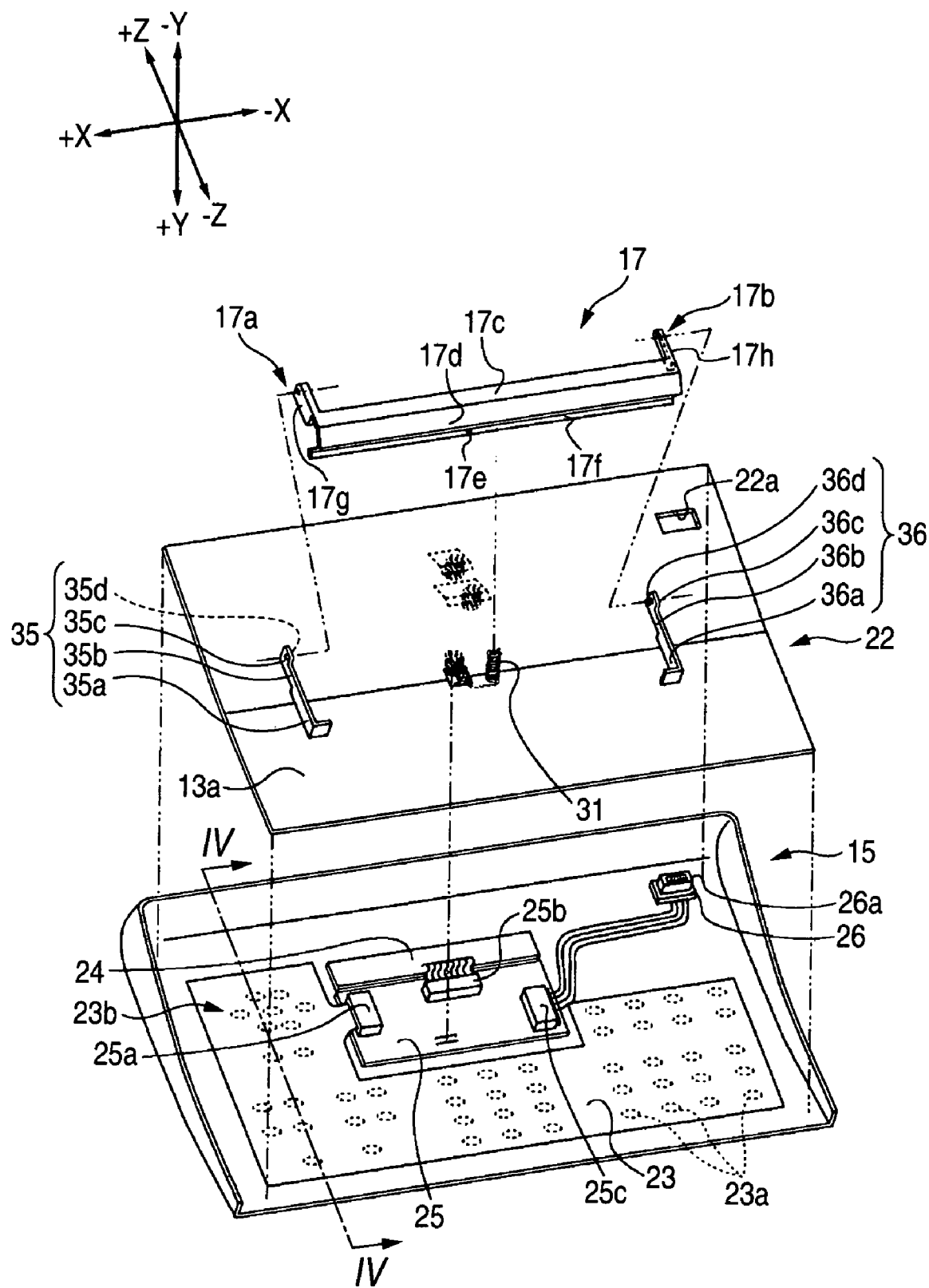
FIG. 2 is an exploded perspective view showing the internal structure of an operation panel.
Figure 3:
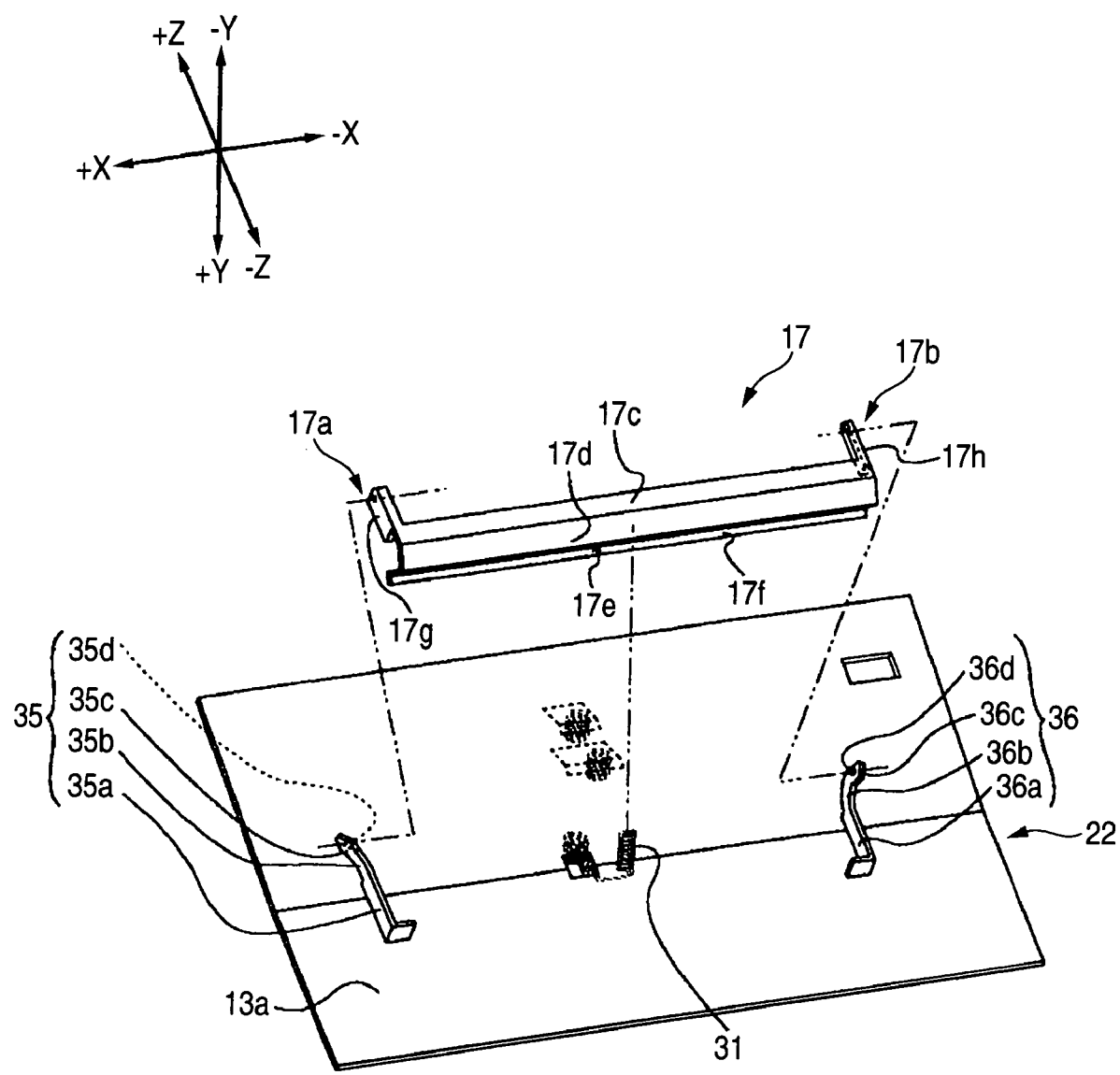
FIG. 3 is a view showing a manner of attaching a pressing plate to fixing plates.
Figure 4:
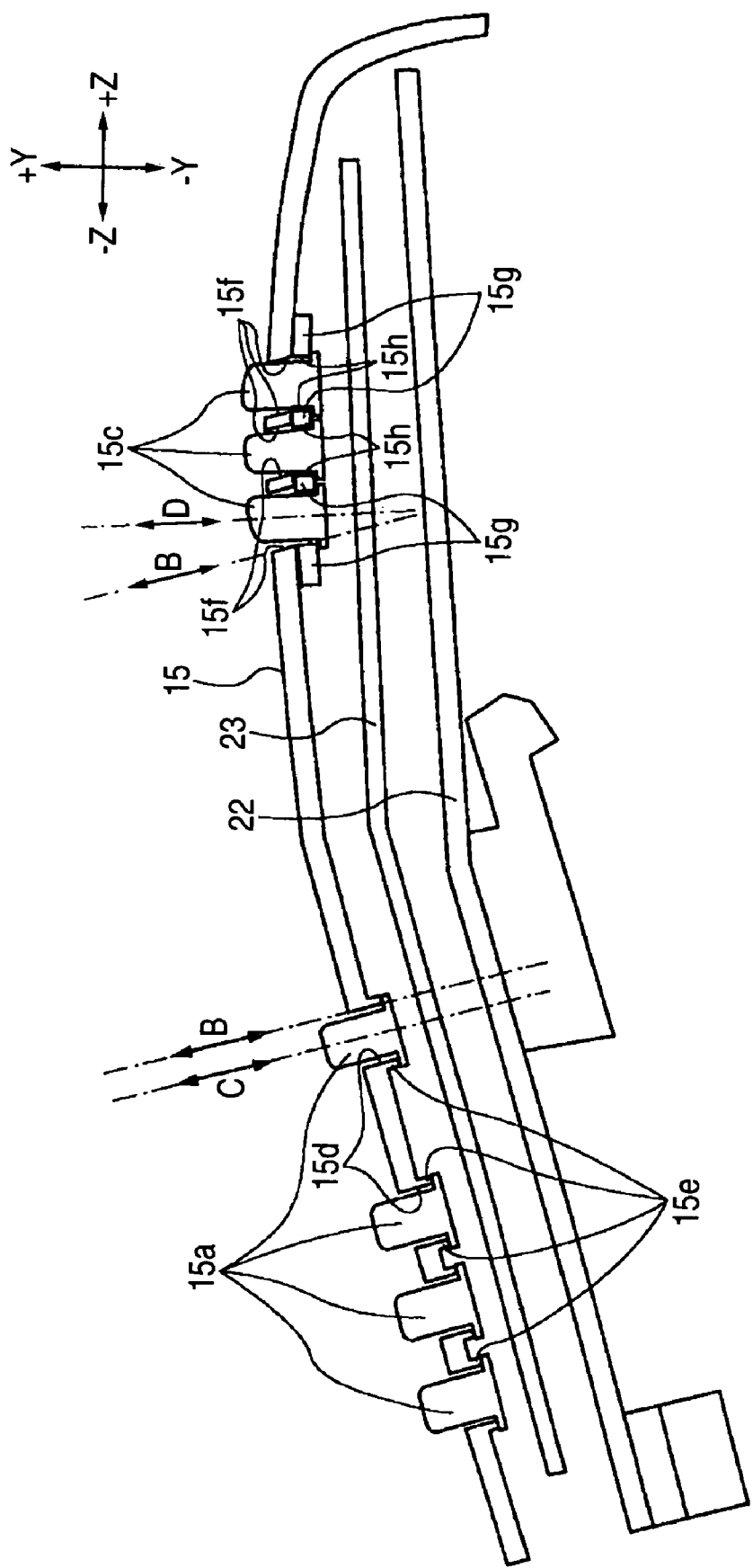
FIG. 4 is an enlarged section view of main portions of an image reading apparatus taken along a one-dot chain line IV-IV in FIG. 2.
Figure 5:
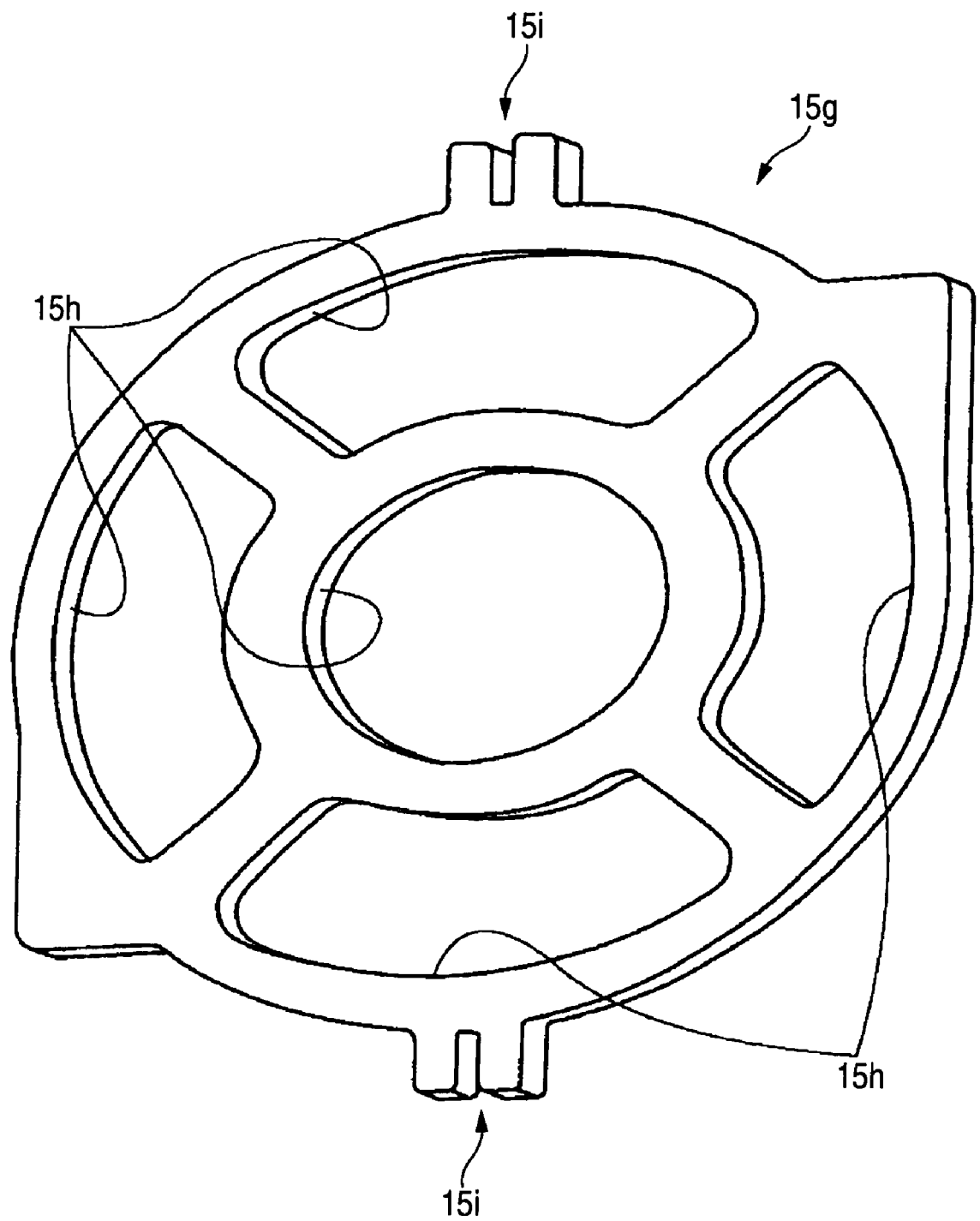
FIG. 5 is a perspective view showing the appearance of a spacer.
Figure 6:
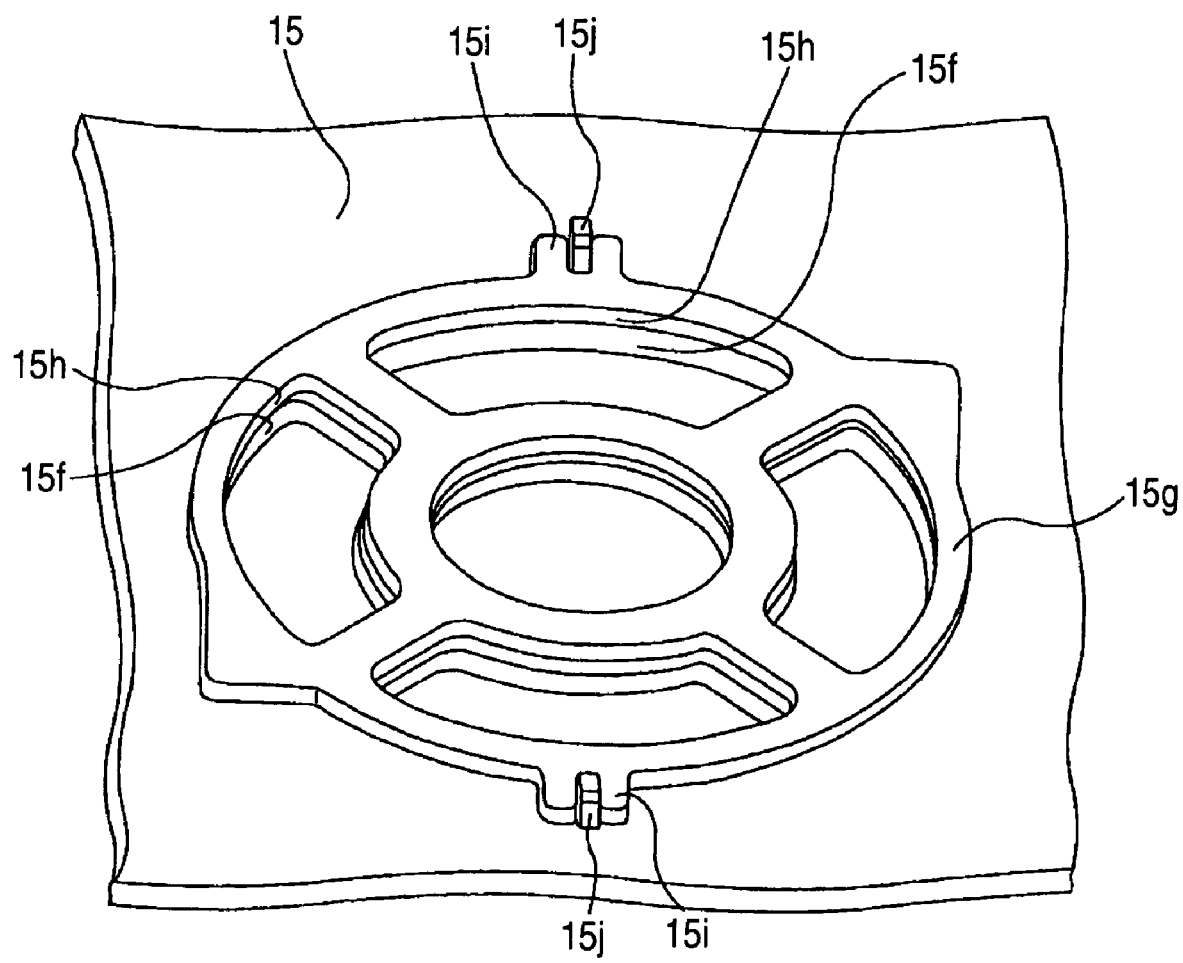
FIG. 6 is a view showing a state where the spacer is attached to the inner face of the operation panel.
Figure 7:
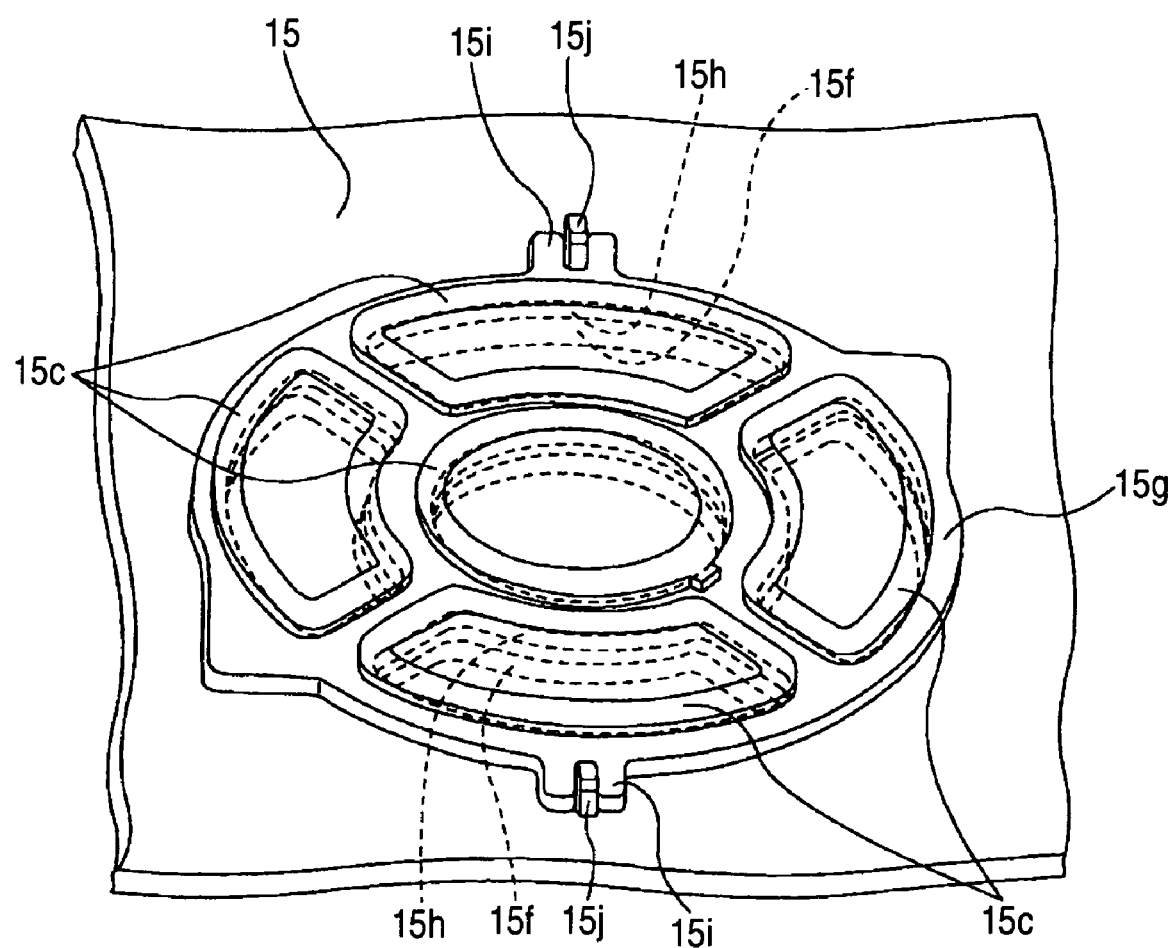
FIG. 7 is a view showing a state where keys are engaged with the spacer attached to the inner face of the operation panel.

Next, the internal structure of the operation panel 15 will be described with reference to FIGS. 2 to 7. FIG. 2 is an exploded perspective view showing the internal structure of the operation panel 15, FIG. 3 is a view showing a manner of attaching a pressing plate 17 to fixing plates 35, 36, FIG. 4 is an enlarged section view of main portions of the image reading apparatus 10 taken along the one-dot chain line IV-IV in FIG. 2, FIG. 5 is a perspective view showing the appearance of a spacer 15g, FIG. 6 is a view showing a state where the spacer 15g is attached to the inner face of the operation panel 15, and FIG. 7 is a view showing a state where keys 15c are engaged with the spacer 15g attached to the inner face of the operation panel 15.

As shown in FIG. 2, when the operation panel 15 is detached and seen from the bottom side of the apparatus 1, the upper face 13a of the transport path 13 is exposed. An intermediate plate 22 constituting the upper face 13a of the transport path 13 is fixed to the inner face (rear face) of the operation panel 15 by screws or the like. Between the intermediate plate 22 and the operation panel 15, disposed are a flexible circuit board 23 and the printed circuit board 25 which detect an input exerted on the keys 15a and the like of the operation panel 15, a display circuit board 24 which drives the LCD 15b, and an intermediate circuit board 26 in which a wiring connector 26a for connecting the circuit boards with a control circuit board (not shown) incorporated in the main unit of the apparatus 1 is disposed.

The keys 15a and the like are disposed so as to be pressable from the outside of the operation panel 15 in the direction perpendicular to the operation face of the operation panel 15. A rubber-made cap (not shown) is disposed in the front end of each of the keys 15a and the like. The cap butts against the flexible circuit board 23 disposed inside the operation panel 15, to give an urging force of restoring the pressed key 15a and the like to the position before the pressing. An electrically conductive chip (not shown) is disposed inside the cap. Pairs of terminals 23a respectively corresponding to the chips of the keys 15a and the like are disposed on the flexible circuit board 23. When the chip is in contact with the pair of terminals 23a, the terminals are connected to each other, and the input of the key 15a and the like is detected. In the flexible circuit board 23, an electric circuit is printed on a film made of an insulator. In order to ensure an input of the keys 15a and the like, pedestals are formed in positions of the intermediate plate 22 respectively corresponding to the terminals 23a of the flexible circuit board 23, so that the flexible circuit board 23 is prevented from being bent as a result of the pressing of the keys 15a and the like.

The printed circuit board 25 is a circuit board having an electric circuit that detects the key 15a and the like corresponding to the terminals that are made conductive by the flexible circuit board 23. Unlike the flexible circuit board 23, the printed circuit board is configured as a circuit board in which an electric circuit is printed on a hard board member.

The flexible circuit board 23 is connected to a connector 25a that is disposed in an end portion of the printed circuit board. The connector 25a is fixed to an en edge of the printed circuit board 25 in a state where its insertion port is directed to the outside in the surface direction of the printed circuit board 25 so that the flexible circuit board 23 is inserted into the connector 25a in the surface direction of the printed circuit board 25. The flexible circuit board 23 and the printed circuit board 25 function as a wiring circuit board.

The display circuit board 24 controls the display on the LCD 15b. The LCD 15b is fixed to the circuit board. The display circuit board 24 is fixed to the inside of the operation panel 15 so that the display screen of the LCD 15b is exposed to the outside of the operation panel 15. The display circuit board 24 is connected to a connector 25b which is disposed in an end portion of the printed circuit board 25. The connector 25b is fixed to an en edge of the printed circuit board 25 in a state where its insertion port is directed to the outside in the surface direction of the printed circuit board 25.

The intermediate circuit board 26 is disposed in a rear end corner portion of the operation panel 15, and used for fixing the connector 26a that is to be connected with the control circuit board (not shown) of the apparatus 1. The intermediate circuit board is placed in a position outside the transport route of the transport path 13 for an original (the transport width is within the length in the longitudinal direction of the pressing plate 17), and hence does not affect transportation of an original. A harness 26b from the intermediate circuit board 26 are connected to a connector 25c of the printed circuit board 25. The intermediate circuit board 26 transmits input signals from the keys 15a and the like of the operation panel 15 to the control circuit board, and relays a display control signal to the LCD 15b. In the intermediate plate 22, a wiring hole 22a through which signal lines from the control circuit board and to be connected to the connector 26a are passed is opened. In order to allow the signal lines from the control circuit board to be easily inserted into the connector when the operation panel 15 is to be mounted on the apparatus 1, the connector 26a is fixed to the intermediate circuit board 26 so that the insertion port is directed in a direction substantially perpendicular to the surface direction of the operation panel 15. In the same manner as the connectors 25a, 25b, the connector 25c of the intermediate circuit board 26 disposed on the printed circuit board 25 is fixed to an en edge of the printed circuit board 25 in a state where its insertion port is directed to the outside in the surface direction of the printed circuit board 25. Namely, the harness 26b which connects the intermediate circuit board 26 with the printed circuit board 25 is coupled with and decoupled from the connector 25c along the surface direction of the printed circuit board 25.

As described above, one face of the intermediate plate 22 is configured as the upper face 13a of the transport path 13. Fixing plates 35, 36 which have a plate-like shape, and which are used for fixing the pressing plate 17 protrude from the upper face 13a. The fixing plates 35, 36 are paired so that the pressing plate 17 which is supported at a substantially middle of the upper face 13a is supported in a direction (the X-axis direction in the figure) perpendicular to the original transportation direction in the surface direction of the upper face 13a. The directions of the plate faces are substantially perpendicular to the upper face 13a, and in parallel with the original transportation direction (the Z-axis direction in the figure). The longitudinal directions of the fixing plates 35, 36 coincide with the transportation direction. The fixing plates 35, 36 function as a support member.

The intermediate plate 22 has a shape in which, in a position where the fixing plates 35, 36 are supported, the plate is bent in an L-like shape in a sectional view along the original transportation direction, in the protruding direction of the fixing plates 35, 36 (see FIG. 1). Each of the fixing plates 35, 36 is configured by: a basal portion 35a or 36a which is supported by the intermediate plate 22 in the vicinity of the position where the intermediate plate 22 is bent; an arm portion 35b or 36b which protrudes from the basal portion 35a or 36a so as not to be in contact with the intermediate plate 22, toward the upstream side of the transport path 13 configured by the intermediate plate 22; a gripping portion 35c or 36c which is disposed in the tip end of the arm portion 35b or 36b; and a boss 35d or 36d. The bosses 35d and 36d protrude from the middles of the respective gripping portion 35c and 36c so as to be opposed to each other.

The pressing plate 17 is swingably supported by the bosses 35d, 36d of the fixing plates 35, 36. The end portions on the swinging side are placed on the downstream side in the original transportation direction. The pressing plate 17 is formed by processing, for example, a steel plate. The pressing plate 17 has: a plate face 17d formed by obtusely bending an end portion close to one end in the widthwise direction of a plate face 17c of a plate in which the lengthwise direction is perpendicular to the transportation direction; a plate face 17e formed by further perpendicularly bending in the bending direction at a position further closer to the end; and a plate face 17f formed by perpendicularly bending in an opposite direction in an end portion closest to the end. The plate face 17c is largely cut away from the other end in the widthwise direction toward the one end, so that the plate face 17c has a U-like shape. The ends in the longitudinal direction of the U-shaped plate face 17c are configured as plate faces 17g, 17h formed by perpendicularly bending in the same direction as the plate face 17d. The support holes 17a, 17b with which the bosses 35d, 36d of the fixing plates 35, 36 are to be engaged are opened in end portions of the plate faces 17g, 17h close to the other end in the widthwise direction of the plate face 17c, respectively. The pressing plate 17 functions as a pressing member.

When the support holes 17a, 17b of the pressing plate 17 are engaged with the bosses 35d, 36d of the fixing plates 35, 36, the pressing plate 17 is swingably supported so that the plate face 17d is contacted with or separated from the CIS 14. In order to maintain the pressed state of the pressing plate 17 against the CIS 14, a spring 31 is disposed between the plate face 17d of the pressing plate 17 and the upper face 13a of the intermediate plate 22. The spring 31 is disposed so as to butt against a substantially middle portion in the longitudinal direction of the plate face 17d. A pressing force is uniformly applied to the pressing plate 17 in a direction perpendicular to the original transportation direction. The bosses 35d, 36d function as support portions and as projections. The support holes 17a, 17b function as engaging portions and as fitting holes.

The portions of the fixing plates 35, 36 excluding the basal portions 35a, 36a are not fixed to the upper face 13a of the intermediate plate 22. Namely, the fixing plates 35, 36 have a shape in which the cutaways leaving the basal portions 35a, 36a at the intermediate plate 22 are formed. The pressing plate 17 is attached to the fixing plates 35, 36 in the following manner. As shown in FIG. 3, the gripping portions 35c, 36c of the fixing plates 35, 36 are gripped to be bent in a direction along which they are further separated from each other (the X-axis direction in the figure), whereby the arm portions 35b, 36b are bent. The distance between the bosses 35d, 36d is increased, so that the support holes 17a, 17b of the pressing plate 17 are positioned between the bosses 35d, 36d, the bosses 35d, 36d are engaged with the support holes 17a, 17b, respectively, and the pressing plate 17 is supported by the fixing plates 35, 36. At this time, the spring 31 butts against the plate face 17d, whereby a pressing force is given in a direction along which the plate face 17d of the pressing plate 17 is separated from the upper face 13a of the intermediate plate 22. The direction along which the plate face is separated from the upper face 13a of the intermediate plate 22 coincides with that along which, when the operation panel 15 is mounted to the apparatus 1, the upper face 13a is directed toward a bottom face 13b (see FIG. 1) of the transport path 13. Namely, the plate face 17d of the pressing plate 17 is pressed against the CIS 14 disposed in the bottom face 13b.

As shown in FIG. 1, the operation panel 15 is placed in the uppermost portion of the apparatus 1. This configuration is employed in order to enable the user to easily operate the apparatus 1. The transport path 13 which is disposed immediately below the operation panel 15 transports an original from the back face of the apparatus 1 to the front face. When the transport path 13 is inclined downward as advancing from the back face of the apparatus 1 to the front face, the user can set originals more easily onto the original tray 11 than the case where such an inclination is not formed. In the apparatus 1 in which this configuration is employed, the portion on the side of the back face of the operation panel 15 is placed in a level higher than that on the side of the front face. Therefore, the embodiment is configured so that the downward inclination of the portion on the side of the back face of the operation panel 15 is made smaller than that of the portion on the side of the front face, thereby suppressing the total height of the apparatus.

However, various wiring circuit boards and the transport path 13 are disposed immediately below the operation panel 15. The space required by the wiring circuit boards cannot be omitted. In the apparatus 1, therefore, the intermediate plate 22 is bent in accordance with the operation panel 15, so that the upper face 13a and the bottom face 13b are made closer in the upstream side of the transport path 13. When the intermediate plate 22 is bent, the placements of parts which are disposed upstream of the bent position in the transport path 13 are affected. For example, the fixing plates 35, 36 which support the pressing plate 17 are made closer to the bottom face 13b of the transport path 13.

In the apparatus 1, therefore, the fixing plates 35, 36 are configured so that the basal portions 35a, 36a are disposed in the downstream side of the transport path 13 and the bosses 35d, 36d which support the pressing plate 17 are placed on the upstream side. If the basal portions 35a, 36a of the fixing plates 35, 36 are placed on the upstream side from the position where the intermediate plate 22 is bent, the upper face 13a of the transport path 13 approaches the bottom face 13b in the upstream side, and hence the sizes of the basal portions 35a, 36a must be reduced in order to prevent a failure from occurring in transportation of an original. In accordance with the reduced sizes, the arm portions 35b, 36b are correspondingly thinned. As a result, the strengths of the fixing plates 35, 36 are reduced. The basal portions 35a, 36a are placed on the downstream side from the position where the intermediate plate 22 is bent, because, in the downstream side, the distance between the upper face 13a of the transport path 13 and the bottom face 13b is not reduced and hence the basal portions 35a, 36a in this position can be configured to be larger in size than those in the upstream side. Since the fixing plates 35, 36 support the pressing plate 17 with clamping the plate from both the sides in the longitudinal direction, the fixing plates 35, 36 do not interfere with the swinging direction of the pressing plate 17. Therefore, the arm portions 35b, 36b and the gripping portions 35c, 36c can be configured so as to have a large size, and the strengths of the fixing plates 35, 36 can be enhanced.

The CIS 14 is placed on the downstream side of the transport path 13 from the positions of the bosses 35d, 36d which are support portions for enabling the fixing plates 35, 36 to support the pressing plate 17. In other words, the bosses 35d, 36d do not exist in the movement range where the plate face 17d of the pressing plate 17 is contacted with or separated from the CIS 14, and hence the movement of the plate face 17d is not restricted. If the support members (the bosses 35d, 36d) for supporting the pressing member are disposed in the movement range of the portion (the plate face 17d) where the pressing member (the pressing plate 17) is contacted with or separated from the CIS 14, the movement range of the portion which is contacted with or separated from the CIS 14 is not restricted. Therefore, the portion in which the movement range of the pressing member and the support members interfere with each other must be configured so as to have a large size. By contrast, in the embodiment, the plate face 17d of the pressing plate 17 is placed with being separated from the bosses 35d, 36d of the fixing plates 35, 36, and, even when they are configured so as to have a large size, their operations do not therefore interfere with each other. Moreover, the plate face 17d which is contacted with or separated from the CIS 14 is positioned downstream in the original transportation direction from the bosses 35d, 36d which support the swinging operation of the plate face. Therefore, an original does not resist against the pressing plate 17, and the original is smoothly transported.

The operation panel 15 is a resin-made panel produced by injection molding. As shown in FIG. 4, one face of the flexible circuit board 23 which is disposed on the inner face of the operation panel 15 butts against pedestals (not shown) of the intermediate plate 22 as described above, and the other face butts against electrically conductive chips (not shown) in caps disposed at the tip end of the keys 15a and the like. In order to enhance the conductivity between the paired terminals 23a (see FIG. 2) by the chip, the depressing direction of the keys 15a and the like disposed in the operation face of the operation panel 15 is substantially perpendicular to the other face of the flexible circuit board 23. Each of the keys 15a and the like is supported so as to be pressable from the outside of the operation panel 15 to the inner side in the direction perpendicular to the operation face of the operation panel 15. The movement direction of each of the keys 15a and the like when the key is depressed is guided by a guide hole 15d of the key 15a opened in the operation face of the operation panel 15. The thickness of the operation panel 15 is increased by ribs 15e which are disposed in edges of the guide holes 15d on the inner face of the operation panel 15, and the movement direction of the keys 15a is stably guided.

The pressing direction of the keys 15a and the like is substantially perpendicular to the operation face of the operation panel 15. Since the operation panel 15 is bent, the pressing direction on the upstream side from the bent position is different from that on the downstream side. In the process of injection molding the operation panel 15, the panel is drawn from molds in one direction. In the embodiment, keys 15a which are placed on the downstream side from the bent position of the operation panel 15 (as shown in FIG. 2, keys 15a in which an input operation is detected by the terminals 23a that are terminals of the flexible circuit board 23 excluding terminals 23b) are larger in number than keys 15c which are placed on the upstream side (as shown in FIG. 2, keys 15c in which an input operation is detected by the terminals 23b of the flexible circuit board 23). Therefore, the direction of drawing the operation panel 15 from the molds (the direction indicated by the arrow B in the figure) is set so that the ribs 15e are disposed in the guide holes 15d along the pressing direction of the keys 15a (the direction indicated by the arrow C in the figure). When the operation panel 15 is configured in this way, however, it is difficult to dispose ribs similarly in guide holes 15f along which the pressing direction of the keys 15c disposed on the upstream side from the bent position is guided, along the pressing direction of the keys 15c (the direction indicated by the arrow D in the figure).

In the embodiment, therefore, the spacer 15g is attached from the inner face of the operation panel 15, to the keys 15c which are placed on the upstream side, to guide the pressing direction of the keys 15c (the direction indicated by the arrow D in the figure) so as to be substantially perpendicular to the operation face of the operation panel 15, thereby attaining a state similar to that where ribs are disposed in the guide holes 15f.

In the embodiment, the keys 15c correspond to the terminals 23b of the flexible circuit board 23 in FIG. 2. The keys are small in number as compared with the whole keys, and placed in close proximity to each other. As shown in FIG. 5, therefore, the spacer 15g is formed as one piece. The spacer 15g is a flat spacer in which five guide holes 15h and two positioning portions 15i for positioning to the inner face of the operation panel 15 are disposed. The guide holes guide five keys 15c in which an input operation is detected by the seven terminals 23b shown in FIG. 2 (among the terminals 23b, the two end terminals in the Z-axis direction) cooperate to detect the input state of one large key.

As shown in FIG. 6, the spacer 15g is fixed by engaging the positioning portions 15i with two engagement projections 15j disposed on the inner face of the operation panel 15. At this time, through holes in which the guide holes 15h of the spacer 15g correspond respectively to the guide holes 15f of the operation panel 15 are formed. As shown in FIG. 7, the keys 15c are inserted from the side of the spacer 15g toward the operation face of the operation panel 15. As a result, the movement direction of the keys 15c when depressed is guided by the guide holes 15h of the spacer 15g as shown in FIG. 4. A sufficient depth in the movement direction of the keys 15c can be ensured by the guide holes 15h and the guide holes 15f of the operation panel 15, so that the keys 15c are stably guided in the movement direction. As described above, the effect same as the ribs 15e of the guide holes 15d for the keys 15a, which cannot be disposed for the keys 15c because of the drawing direction of the molds, can be attained simply by attaching one piece, i.e., the spacer 15g to the operation panel 15. The spacer 15g functions as a guide member.

As described above, in the apparatus 1, in order to suppress the total height of the apparatus, the angle of the downward inclination of the upstream portion of the operation panel 15 which is disposed along the original transport path 13 that is downward inclined in the uppermost portion of the apparatus is made smaller than that of the downstream portion. In accordance with this configuration, the intermediate plate 22 constituting the upper face 13a of the transport path 13 is bent in an L-like shape in a section view. As a result, the upper face 13a and the bottom face 13b are made close to each other in the upstream side of the transport path 13. However, the fixing plates 35, 36 which support the pressing plate 17 disposed on the upper face 13a protrude from the downstream side of the transport path 13 toward the upstream side. Therefore, the basal portions 35a, 36a can be configured so as to have a large size. As a result, also the arm portions 35b, 36b and the gripping portions 35c, 36c can be configured so as to have a large size, and the strengths of the fixing plates 35, 36 can be enhanced.

In order to enable the operation panel 15 to be integrally molded, the configuration in which the pressing direction of the keys 15c does not coincide with the direction of drawing the operation panel 15 from the molds is employed. However, the spacer 15g is disposed to guide the pressing direction of the keys 15c. Therefore, the shape of the operation panel 15 is realized without impairing the operability of the keys 15c, and the miniaturization of the apparatus is not impeded.

Since the attachment and detachment directions of the connectors which are disposed on the printed circuit board 25 and used for connecting with other circuit boards are made coincident with the surface direction of the printed circuit board 25, the attachment and detachment directions of the connectors coincide with the surface direction of the inner face of the operation panel 15, so that the height required for connecting portions of the connectors can be reduced. According to the configuration, even when the operation panel 15 has a bent shape as described above, it is not required to prepare a large space for the wiring circuit boards, and the miniaturization of the apparatus can be realized. Moreover, electrical connection between the control circuit board of the main unit of the apparatus and the printed circuit board 25 is conducted through the intermediate circuit board 26, and the intermediate circuit board 26 is disposed in a rear corner portion of the inner face of the operation panel 15. Therefore, the shape of the operation panel 15 is realized without impairing convenience of the attachment of signal lines to the connector 26a of the intermediate circuit board 26, and the miniaturization of the apparatus is not impeded.

In this embodiment, the position where the cover member is bent is located upstream in the transport path from a position where the cover member is opposed to the image reading section 14.

Therefore, the one end of the pressing member 17 which is contactable with and separable from the image reading section 14 can be placed with being shifted from the position where the cover member is bent. When the other end of the pressing member 17 is supported in the position where the cover member is bent, the other end can be configured in a large size, and hence the strength of the other end can be enhanced.

Further, the support member 35, 36 has a cutaway on the upstream side thereof to enable an end portion of the support member on the upstream side to be bent along the rear face of the cover member in a direction perpendicular to the transportation direction, the cutaway leaving an end portion of the support member on the downstream side which is coupled to the cover member.

Therefore, the pressing member 35, 36 can be attached to the support member while bending the support member. Therefore, the attachment of the pressing member can be easily conducted.

In addition, the support member has two support members 35, 36 separated in the direction perpendicular to the transportation direction, each of the support members has a support portion in the end portion on the on the upstream side which supports the pressing member, the pressing member 17 has engaging portions in the other end, the engaging portions being engaged and supported with the support portions of the support members, and the two support members 35, 36 are caused to swingably support the pressing member by bending the end portions on the upstream side in opposite directions, and then engaging the support portions with the engaging portions of the pressing member.

Therefore, the pressing member 17 can be easily attached to the support members, and the number of parts can be reduced. Thus, the production process can be simplified and the production cost can be lowered.

Also, the support portions of the two support members 35, 36 are projections which protrude toward respective opposed support members, and the engaging portions of the pressing member are fitting holes into which the projections of the support members are to be fitted.

Therefore, the structure for supporting the pressing member 17 by the support members can be simplified, and easily processed. Thus, the production cost can be lowered.

Furthermore, the apparatus 10 further includes a connector which is disposed on the wiring circuit board, and to which a harness for conducting connection with the intermediate circuit board is detachably attached, and the harness is attached to or detached from the connector in a direction along which a face of the wiring circuit board extends.

Therefore, the harness is attached to or detached from the connector in the direction along which the face of the wiring circuit board extends, and hence the direction along which the rear face of the cover member is made close to the face of the wiring circuit board is different from that of attaching or detaching the harness. Thus, the wiring circuit board can be disposed in close proximity to the rear face of the cover member, so-that the size of the apparatus can be reduced.

Further, the multi-functional apparatus 1 has the aforesaid image reading apparatus 10 and an image forming apparatus which is disposed below the image reading apparatus, and which forms an image that is read from the medium to be read by the image reading apparatus, on a medium to be recorded.

Accordingly, the total height of the multi-functional apparatus can be shortened, and the size can be reduced.

It is a matter of course that the invention can be variously modified. The fixing plates 35, 36 are protruded integrally from the intermediate plate 22. Alternatively, the fixing plates may be disposed separately from the intermediate plate 22, and then attached to the intermediate plate 22. The fixing plates 35, 36 and the pressing plate 17 are supported by the bosses 35d, 36d and the support holes 17a, 17b. Alternatively, holes may be formed in these plates, and the plates may be supported by pins or the like.

The operation panel 15 is molded by molds, and the drawing direction coincides with the pressing direction of the keys 15a. Alternatively, the drawing direction may coincide with the pressing direction of the keys 15c, and a spacer for guiding the pressing direction may be disposed for the keys 15a.

One end of the flexible circuit board 23 may be extended to be connected to the intermediate circuit board 26, and the connection between the intermediate circuit board 26 and the printed circuit board 25 may be conducted with using the flexible circuit board 23.

In the embodiment, the multi-functional apparatus 1 has been described as an example. The configuration of the image reading apparatus of the embodiment can be adequately applied also to a copying apparatus which is not provided with a facsimile function. The image forming apparatus 50 may be a known inkjet printer.

The invention can be applied to an image reading apparatus, a copying apparatus comprising an image reading apparatus, a facsimile apparatus, or a multi-functional apparatus comprising such apparatuses.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the spirit and scope of the invention.

What is claimed is:

1. An image reading apparatus comprising:
   a transport path through which a medium to be read is transported, the transport path being inclined downwardly from an upstream side in a transportation direction to a downstream side;
   an image reading section which is disposed in the transport path which reads an image formed on the medium to be read that is transported along the transport path;
   a cover member which is disposed to cover the image reading section and the transport path, an outer surface of the cover member having an angularly bent portion that is bent to form an upstream portion and a downstream portion such that a downward inclination of the downstream portion is larger than a downward inclination of the upstream portion;
   a support member having a plate form, the support member disposed on a bottom face of the cover member and protruding toward the upstream side from a proximity of a position where the cover member is bent; and
   a pressing member having a second end supported by the support member to cause a first end to be contactable with and separable from the image reading section such that the pressing member may press the transported medium to be read against the image reading section.

2. The image reading apparatus according to claim 1, wherein the position where the cover member is bent is located upstream in the transport path from a position where the cover member is opposed to the image reading section.

3. The image reading apparatus according to claim 1, wherein the support member has a cutaway on the upstream side thereof to enable an end portion of the support member on the upstream side to be bent along a rear face of the cover member in a direction perpendicular to the transportation direction, the cutaway leaving an end portion of the support member on the downstream side which is coupled to the cover member.

4. The image reading apparatus according to claim 3, wherein the support member comprises two support members separated in the direction perpendicular to the transportation direction, each of the support members comprises a support portion in the end portion on the on the upstream side which supports the pressing member;
   the pressing member comprises engaging portions in the end portion on the downstream side, the engaging portions being engaged and supported with the support portions of the support members; and
   the two support members are caused to swingably support the pressing member by bending the end portions on the upstream side in opposite directions, and then engaging the support portions with the engaging portions of the pressing member.

5. The image reading apparatus according to claim 4, wherein the support portions of the two support members are projections which protrude toward respective opposed support members; and
   the engaging portions of the pressing member are fitting holes into which the projections of the support members are to be fitted.

6. An image reading apparatus comprising:
   a transport path through which a medium to be read is transported, the transport path being inclined downwardly from an upstream side in a transportation direction to a downstream side;
   an image reading section which is disposed in the transport path and which reads an image formed on the medium to be read that is transported along the transport path;
   an operation member which is formed by integral molding and is disposed to cover the image reading section, the operation member being bent to form an upstream portion and a downstream portion such that a downward inclination of the downstream portion is larger than a downward inclination of the upstream portion, and which has a first hole in the upstream portion, the first hole being cut perpendicular to a plane of the upstream portion, and a second hole in the downstream portion, the second hole being cut parallel to the first hole;
   a key that is depressably provided on the operation member; and
   a guide member which is disposed on a bottom face of the operation member such that the guide member guides a depression direction of the key.

7. The image reading apparatus according to claim 6, wherein the key comprises a plurality of keys, and the guide member guides depressing movement of the plurality of keys.

8. An image reading apparatus comprising:
   a transport path through which a medium to be read is transported, the transport path being inclined downwardly from an upstream side in a transportation direction to a downstream side;
   an image reading section which is disposed in the transport path and which reads an image formed on the medium to be read that is transported along the transport path;
   an operation member which is disposed to cover the image reading section, an outer surface of the operation member having an angularly bent portion that is bent to form an upstream portion and a downstream portion such that a downward inclination of the downstream portion is larger than a downward inclination of the upstream portion;
   a wiring circuit board which is disposed on a bottom face of the operation member, and comprises a circuit; and
   an intermediate circuit board which is disposed at an upstream end of the bottom face of the operation member and laterally outside of the transport path, the intermediate circuit providing electrical coupling from the image reading apparatus to the wiring circuit board.

9. An image reading apparatus according to claim 8, wherein the apparatus further comprises a connector which is disposed on the wiring circuit board, and to which a harness for conducting connection with the intermediate circuit board is detachably attached; and
   wherein the harness is attached to or detached from the connector in a direction along which a face of the wiring circuit board extends.

10. A multi-functional apparatus comprising:
    an image reading apparatus including:
      a transport path through which medium to be read is transported, the transport path being inclined downwardly from an upstream side in a transportation direction to a downstream side;
      an image reading section which is disposed in the transport path and which reads an image formed on the medium to be read that is transported along the transport path;
      a cover member which is disposed to cover the image reading section and the transport path, an outer surface of the cover member having an angularly bent portion that is bent to form an upstream portion and a downstream portion such that a downward inclination of the downstream portion is larger than a downward inclination of the upstream portion;

a support member having a plate form, the support member being disposed on a bottom face of the cover member and protruding toward the upstream side from a proximity of a position where the cover member is bent;

a pressing member having a second end supported by the support member to cause a first end to be contactable with and separable from the image reading section such that the pressing plate may press the transported medium to be read against the image reading section; and an image forming apparatus which is disposed below the image reading apparatus, and which forms an image that is read from the medium to be read by the image reading apparatus, on a medium to be recorded.

11. A multi-functional apparatus comprising:

an image reading apparatus including:

a transport path through which a medium to be read is transported, the transport path being inclined downwardly from an upstream side in a transportation direction to a downstream side;

an image reading section which is disposed in the transport path and which reads an image formed on the medium to be read that is transported along the transport path;

an operation member which is formed by integral molding and is disposed to cover the image reading section, the operation member being bent to form an upstream portion and a downstream portion such that a downward inclination of the downstream portion is larger than a downward inclination of the upstream portion and which has a first hole in the upstream portion, the first hole being cut perpendicular to a plane of the upstream portion, and a second hole in the downstream portion, the second hole being cut parallel to the first hole;

a key that is depressably provided on the operation member; and a guide member which is disposed on a bottom face of the operation member such that the guide member guides a depression direction of the key;

an image forming apparatus which is disposed below the image reading apparatus, and which forms an image, that is read from the medium to be read by the image reading apparatus, on a medium to be recorded.

12. A multi-functional apparatus comprising:

an image reading apparatus including:

a transport path through which a medium to be read is transported, the transport path being inclined downwardly from an upstream side in a transportation direction to a downstream side;

an image reading section which is disposed in the transport path and which reads an image formed on the medium to be read that is transported along the transport path;

an operation member which is disposed to cover the image reading section, an outer surface of the operation member having an angularly bent portion that is bent to form an upstream portion and a downstream portion such that a downward inclination of the downstream portion is larger than an inclination of the upstream portion;

a wiring circuit board which is disposed on a bottom face of the operation member, and comprises a circuit;

an intermediate circuit board which is disposed at an upstream end of the bottom face of the operation member and laterally outside of the transport path, the intermediate circuit providing electrical coupling from the image reading apparatus to the wiring circuit board; and an image forming apparatus which is disposed below the image reading apparatus, and which forms an image, that is read from the medium to be read by the image reading apparatus, on a medium to be recorded.

* * * * *